Sept. 2, 1941.         W. W. HARTMAN         2,254,524
BAND BLADE SLICING MACHINE
Filed Oct. 14, 1940         4 Sheets-Sheet 2

Inventor
William Walter Hartman
Attorneys.

Sept. 2, 1941.  W. W. HARTMAN  2,254,524
BAND BLADE SLICING MACHINE
Filed Oct. 14, 1940  4 Sheets-Sheet 3

Inventor
William Walter Hartman.

Attorneys.

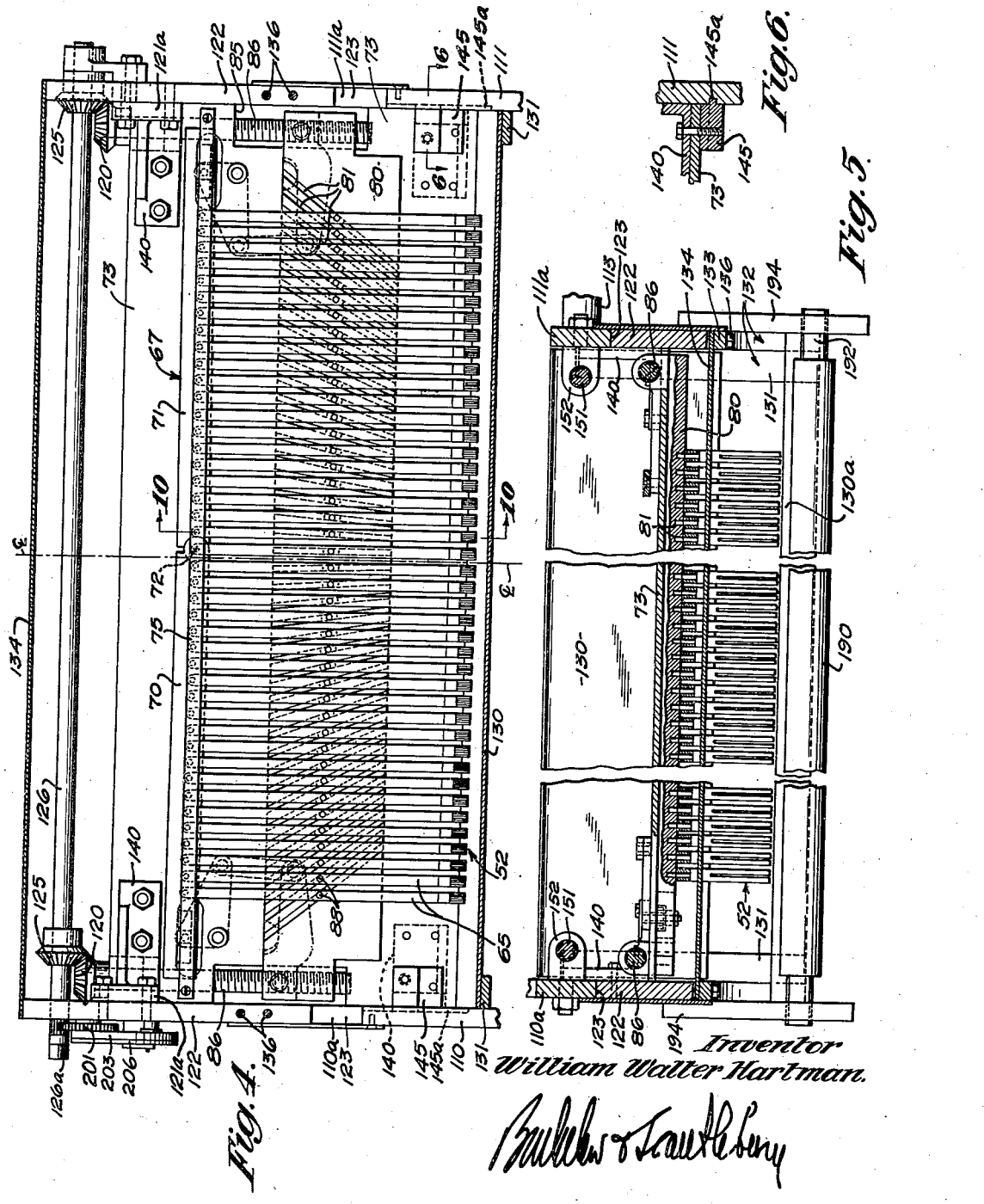

Patented Sept. 2, 1941

2,254,524

UNITED STATES PATENT OFFICE 2,254,524

BAND BLADE SLICING MACHINE

William Walter Hartman, Los Angeles, Calif.

Application October 14, 1940, Serial No. 361,075

7 Claims. (Cl. 146—88)

This invention relates generally to bread or other article slicing machines of the endless band type, and more particularly to band blade slicing machines in which provision is made for adjusting the separation distance of the blades.

Bread slicing machines of the endless band blade type comprise a multiplicity of endless band blades trained on a system of rotatable drums, and so arranged as to present a multiplicity of blade courses disposed in spaced parallel planes, against and through which the loaves to be sliced may be moved. In a simple and illustrative type of machine, two spaced drums are employed, and the blades are arranged in figure 8 form and looped over the two drums, their central portions constituting the above mentioned blade courses which are supported in spaced parallel slicing planes.

In early machines of this type, a pair of fixed, rigid blade guides, typically comb-like, slotted plates, were provided above and below the path of the loaves to space the blade courses for the slice thickness desired and to guide them in the spaced parallel planes. This made a very satisfactory machine for one slice thickness, the fixed blade guides, tightly mounted in the frame of the machine, accurately preserving the blade spacing and requiring no attention until considerable wear had taken place and replacement became necessary.

Demand was next made for adjustability of slice thickness, and attempt was then made to equip band blade slicing machines with several interchangeable pairs of such fixed, rigid guides, with guide slots of different spacing. Great difficulty was encountered, however, in making the adjustment, particularly in moving the blades along the drum to the new spacing distance. Performance of this operation involves the necessity of detensioning the blades with the blade guides removed, since the blades cannot otherwise be manually moved along the drums. The act of de-tensioning the blades, however, produces a condition not only most difficult to cope with, but having harmful effects on the keen edges of the blades. The blades are of tempered steel, and in originally mounting them on the machine have been twisted into some such form as for example a figure 8. They are therefore under substantial torsional stress, and when loosened, immediately spring, twist, squirm and jump about in a most remarkable and ungovernable manner, such that the difficulty in moving them respectively to their new intended spacing, then installing the new fixed or solid blade guides, and threading the blade courses through these guides, is much beyond toleration. Moreover, the uncontrolled action of the blades while detensioned is such as to cause them to collide with one another, so as to injure their cutting edges.

Machines having two series or rows of individual, continuously adjustable blade guide devices, one row above and one row below the loaf path, have been evolved to meet this difficulty. With such machines, the adjustment is made without detensioning the blades, and with the machine running, so that as the guides are moved transversely of the blade courses, they move the blades along the drums, much after the operation of a belt-shifter. An example of such a machine is found in my prior Patent No. 2,181,233, issued Nov. 28, 1939, entitled Band blade slicing machine. Such a machine, however, while permitting ready and easy movement of the tensioned blades longitudinally of the supporting drums, also has several inherent disadvantages, which must be mentioned, not for the purpose of derogation, but to point out the unfulfilled need for the present invention. In the first place, adjustable blade guide devices necessarily involve a considerable amount of movable mechanism and parts which in the past have characteristically been more or less complex in order to meet all of the essential requirements of such devices. This invites a certain amount of play or looseness in this multiplicity of mechanism, resulting in lack of rigidity in this part of the machine, and a resulting slight but undesirable non-uniformity of slice thickness. A further difficulty arises from the fact that the adjustment mechanism for the lower guides, being below the loaf path, often becomes clogged with the crumbs that fall down onto it, and this tends to stick or jamb the adjusting mechanism. A still further disadvantage in a machine such as here referred to is its relatively high cost.

The general object of the present invention is to provide an improved slicing machine having provision for adjusting blade spacing, and having the advantages of both the fixed guides and the double adjustable guides, without having the above enumerated disadvantages of either.

In accordance with the present invention, I provide one interchangeable solid or rigid blade guide, that is, a blade guide of fixed guide slot spacing, on one side of the loaf path (preferably below), and I provide one adjustable blade guide on the other side of the loaf path (preferably above). When the blade spacing of the machine is to be changed, the one solid blade guide is first removed. The drums on which the blades are mounted are then driven without detensioning, and the single adjustment mechanism is then manipuated to change the spacing of the guides. The transverse pressure so exerted on the blades by the single adjustment mechanism causes the blades to travel along the drum to the new desired spacing interval, the action being like that of a belt shifter, and the blades moving easily and readily to their new positions. This having been accomplished, the machine is stopped, and a different solid blade guide, having guide slots conforming to the new spacing, is installed. This machine has all of the acknowledged advantages characteristic of a machine equipped with solid or fixed guides above and below the loaf path, with none of its disadvantages, and has all of the advantages of the type of machine equipped with adjustable blade guides above the below the loaf path, with none of its disadvantages. Thus, blade spacing is changed without de-tensioning the blades, and therefore without the vexing, uncontrolled action of the blades and injury to their sharpened edges which results when the blades are loosened on a machine of the original fixed blade guide type. The rigidity of the single solid guide is, so to speak, reflected across the area of the loaf path to lend support within the area of the less rigid adjustable guides, thus stabilizing the machine, and holding the blades to more uniform spacing. The substitution of a simple interchangeable solid blade guide, which may constitute no more than a simple slotted plate, for one of the more or less complicated adjustable guide devices, obviously reduces the cost of manufacture of the machine by a substantial amount. Further, by employing the interchangeable solid guide below the loaf path and the adjustable guides above the loaf path, the difficulty which comes about when crumbs fall into and clog up an adjustable guide mechanism is entirely eliminated.

The present invention thus provides the novel combination of a row or set of individual, adjustable guides, and a solid, fixed guide, of fixed guide slot spacing, the latter being interchangeable with other guides having different guide slot spacings. As pointed out above, the solid fixed guide cooperates with and aids in supporting and stabilizing the adjustable guides, and the combination has the further beneficial result of accomplishment of blade spacing adjustment without detensioning blades in a machine employing but half the adjustment mechanism heretofore required.

One typical and illustrative slicing machine embodying the present invention will now be described in some detail, reference for this purpose being had to the accompanying drawings, in which:

Fig. 3a is a fragmentary view taken as indicated by line 3a—3a of Fig. 3;

Fig. 4 is a section taken on line 4—4 of Fig. 3;

Fig. 5 is a section taken on broken line 5—5 of Fig. 3;

Fig. 6 is a detail section taken on line 6—6 of Fig. 4;

Fig. 10 is a detail section on line 10—10 of Fig. 4;

Fig. 11 is a perspective view of a movable blade guide;

Fig. 12 is a detail section as indicated by line 12—12 of Fig. 2, showing a portion of a fixed blade guide;

Figure 1:
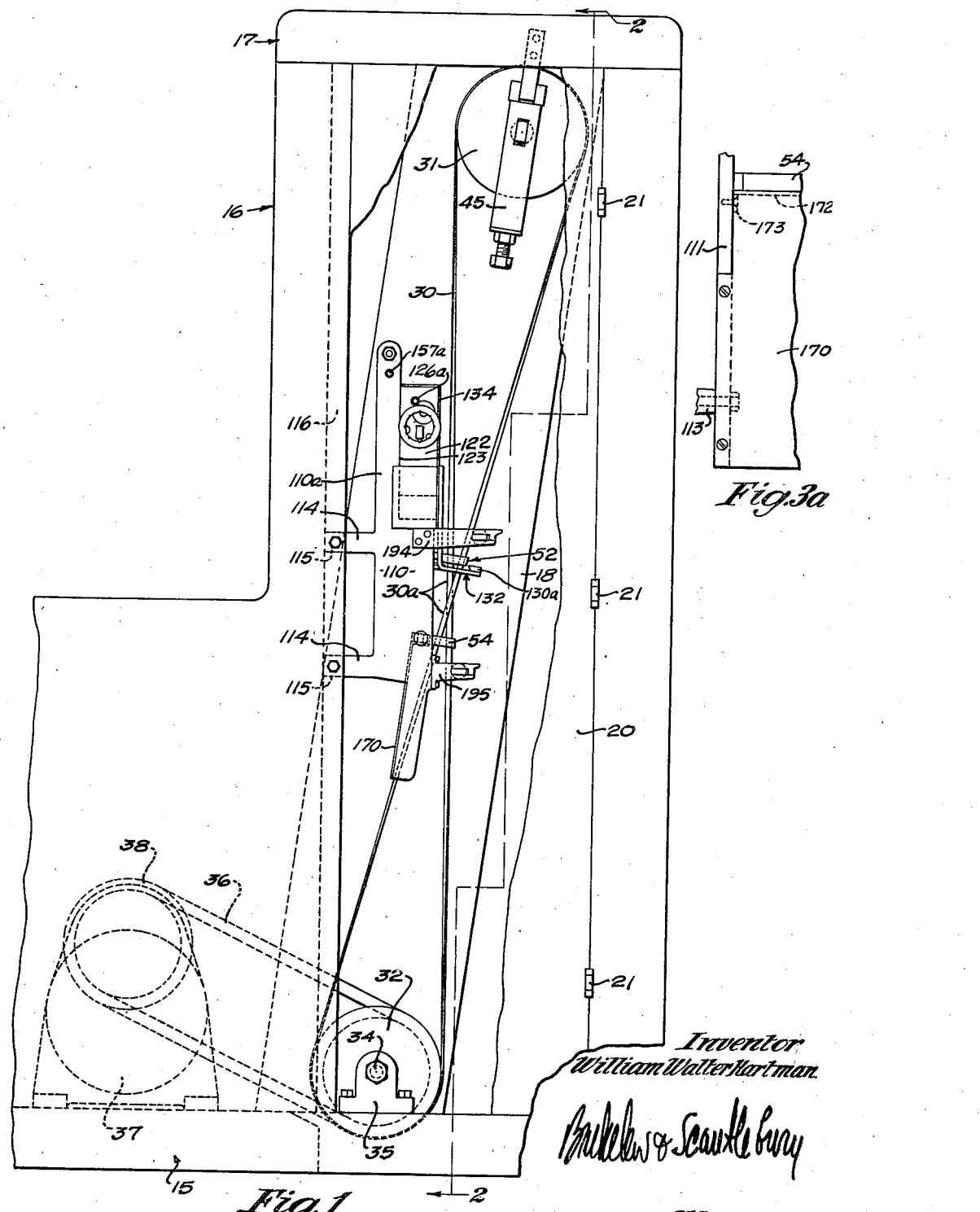
Fig. 1 is a side elevation of an illustrative bread slicing machine in accordance with the invention, with parts broken away.
Figure 2:
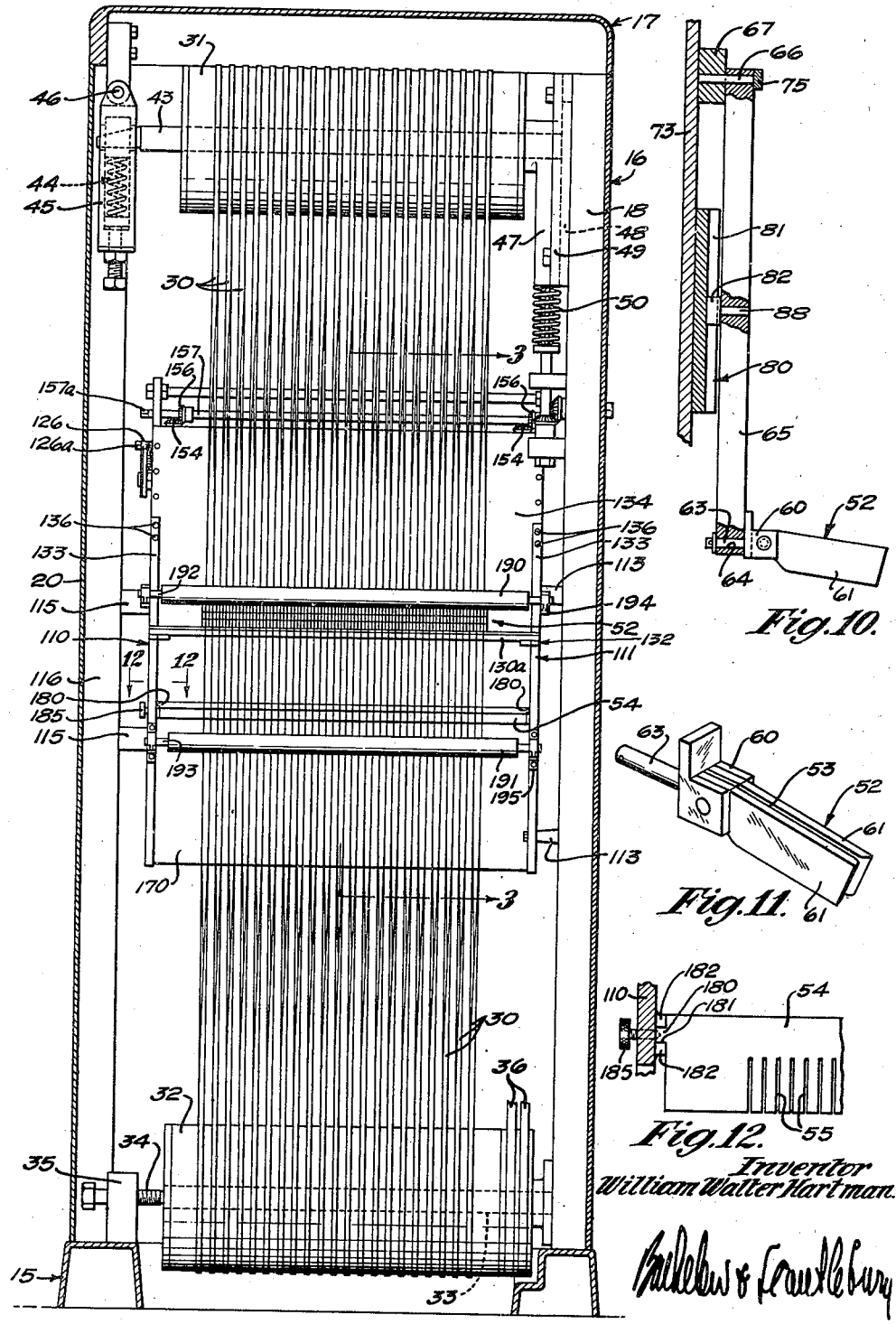
Fig. 2 is a section taken on broken line 2—2 of Fig. 1.

The general frame structure of the machine includes a base 15, upon which is mounted a vertically elongated rectangular frame or housing structure 16 surmounted by a top 17. Mounted on base 15 and extending upwardly to top 17, at one side of the machine, is a channel member 18, which constitutes a part of the stationary frame, and on which certain operative parts of the machine are mounted. In the present instance, this channel member is disposed at somewhat of an angle with reference to vertical, as indicated in Fig. 1, which results in a certain convenient disposition of the various members of the machine. The rectangular housing may be suitably braced in any desired manner, the details of which need not here be illustrated. The front side of the housing is equipped with a swinging door 20, hinged to housing 16 as at 21, this door reaching from base 15 to top 17.

Figures 8, 9:
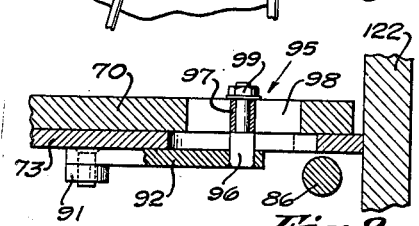
Fig. 8 is a detail section taken on line 8—8 of Fig. 7.
Fig. 9 is a section taken on line 9—9 of Fig. 7.

A plurality of tensed endless band blades 30 are looped over upper and lower band blade supporting drums 31 and 32, respectively, which preferably and as here illustrated are of the same diameter and have their axes substantially parallel. The simple form of machine here chosen for illustrative purposes has just two drums, and the blades are arranged thereon in figure 8 form, the upper loop of each blade being passed over upper drum 31, the blade being then twisted through a half turn, and its lower loop being passed over lower drum 32. This arrangement brings the cutting edges 30a of both courses of each band blade to a position in which they cross one another and in which they are directed toward the end of the machine from which the loaves or other articles to be sliced are fed, this being understood to be the left-hand end of the machine as viewed in Fig. 1. While I here show a simple figure 8 type of machine, however, it is to be understood this is for illustrative purposes only and that such arrangement constitutes no limitation on the invention.

Lower drum 32 is revolubly mounted on a non-rotatable shaft 33 projecting from frame member 18, and supported at its forward end by a screw 34 mounted in a block 35 supported on base 15. Belts 36 drive one end of drum 32, the belts being driven from motor 37 through pulleys 38. These drum driving arrangements are conventional and need not be described in detail.

Upper drum 31 is revolubly mounted on a non-rotatable shaft 43. The machine here chosen for illustrative purposes is of a type in which the blades are tensioned by means of spring supporting devices for the two ends of upper drum shaft 43. Such a mounting for the upper drum of the machine is disclosed and claimed in my copending application, Ser. No. 336,842, filed May 23, 1940, and entitled Multiple band blade slicing machine, and for a complete description, reference is made to said application. It will suffice here to say that the one end of drum shaft 43 is supported by compression spring means at 44, contained within a hanger 45 pivotally suspended at 46 from the frame structure at the top of the machine, and the other end of drum shaft 43 is supported by a slide member 47, slidable in a way 48 of a guide member 49 secured to frame member 18, said way 48 extending in a direction determined by a line passing through the axes of the two drums, slide member 47 being supported by compression spring means at 50. Thus drum shaft 43 and its drum 31 are spring urged in an upward direction, placing the blades 30 under constant tension.

Along the blade courses between the drums, I provide a row of individual blade twisting guides 52, each having a flat, vertical blade receiving guide slot 53 (Figs. 1 and 11), which guides are movable in a direction transversely of the blade courses to vary the spacing therebetween, and I also provide a fixed blade guide member or plate 54 having vertical blade receiving guide slots 55 (Figs. 1 and 12), the row of adjustable guides 52 and the fixed guide plate 54 being spaced apart so as to form between them a slicing zone extending above and below the point of crossing of the blade courses. Preferably the individual, adjustable guides 52 are above the slicing zone, and the fixed guide below it, though this is not absolutely essential. In this slicing zone the blades run in spaced parallel planes, being twisted into such planes by the slots 53 in the individual guides 52 and by the slots 55 in the fixed plate 54.

The loaves may be advanced toward the blades along a direction line substantially normal to a plane determined by the axes of the two blade supporting drums, being here indicated as movable toward the blades along some suitable sustaining means or table, such as diagrammatically indicated at S. This table S is alined with the upper plane of the fixed, lower guide plate 54, which serves as the bottom support for the loaves as they pass through the blades. The plate 54 may also be approximately normal to the plane determined by the axes of the two blade supporting drums, and the upper, adjustable guides 52 are here shown as substantially parallel to plate 54, though guides 52 are not in the present instance utilized as upper guides for the loaves, a later described loaf hold-down member positioned just below the guides 52 being utilized in this instance for the purpose stated.

The individual, adjustable guides 52 may be provided with mechanism of any suitable type for moving them in a direction transversely of the blade courses to vary the spacing of the courses: I here show for illustrative purposes a suitable and preferred type of mechanism for this purpose, which is of the type disclosed and claimed in my prior Patent No. 2,181,283. It is of course to be understood that any suitable adjustment mechanism for properly moving the guides 52 may be substituted for that here shown, though for the purpose of disclosing a complete and operative machine, a detailed description of the specific mechanism chosen for illustrative purposes will here be given.

The individual guides 52, as shown in Fig. 11, each embody a mounting 60 and a pair of guide plates or fingers 61 projecting forwardly therefrom, said plates or fingers being spaced to provide the aforementioned guide slot 53.

Projecting rearwardly from the mountings 60 are mounting pins 63 and these pins project through and are pivotally received within drill holes 64 in the lower ends of depending, swinging arms 65, the rearward sides of mountings 60 engaging and being rotatable upon the adjacent surfaces of arms 65. The upper ends of arms 65 are pivotally mounted, by means of pivot pins 66, on a supporting arm carrier 67 extending transversely of the blade courses (Figs. 4 and 10). The upper ends of arms 65 are pivotally mounted on carrier 67 on equally spaced centers, the spacing being equal to the mean of the minimum and maximum slice thickness desired. Preferably, and as here shown, arm carrier 67 comprises a pair of approximately horizontal bars or arms 70 and 71 pivotally connected to one another near the center line of the machine, as by means of a pivot pin 72 (Figs. 3 and 4), and this pivot pin 72 is set in and extends from a vertical transversely extending mounting plate 73, the supporting provisions for which will be mentioned later. Pivot pin 72 takes the place of the pivot pin 66 which would be at that location if the pivot connection between arms 70 and 71 were not employed, and serves as a mounting for the corresponding arm 65, as will be clear from Figs. 3, 4 and 10. The location of this pin connection between arms 70 and 71 is preferably offset approximately half the thickness of a slice from the center line of the machine, and there are an equal number of arms 65 on each side of the center line. A keeper strap 75 secured to plate 73 confines arms 65 against working off the pivot pins 66.

The adjacent ends of arms 70 and 71 are thus pivotally mounted on an anchoring pin 72 projecting from mounting plate 73. The other ends of arms 70 and 71 are supported and arranged for limited vertical movement to compensate certain conditions as will later be described; for the present this movement of arms 70 and 71 may be disregarded. One swinging arm 65 carrying a blade guide 52 is provided for each course of each blade, or in other words, there are two of said arms and guides for each blade, and these arms are adapted to swing on the parallel axes of pivots 66 in a plane extending in a general way transversely of the machine for the purpose of adjusting the distance between blade guides. Since the blade guides 52 are pivotally mounted on the lower ends of arms 65, they are capable of relative rotation with reference to arms 65 as the latter are moved in this plane of action. Accordingly, these blade guides, under the constraint imposed by the travelling central portions of the blade courses, pivot on the lower ends of the arms in such a way that their blade guide slots 53 remain vertical during swinging of the arms. At the same time, however, the blade guides support the blade courses in positions twisted 90° from their positions on the drums 31 and 32, or in other words, in spaced parallel planes extending longitudinally of the machine. Thus it will be understood that as arms 65 are swung on their pivot mountings 66, blade guides 52 will be separated or moved closer together, and that as this operation takes place, the blade guides, under the constraint imposed by the blades themselves, have a relative pivotal action on the lower ends of the arms such as to maintain the guide slots 53 in vertical planes.

A preferred means for swinging arms 65 in such a way as to adjust the spacing distance between the guide slots of the multiplicity of blade guides comprises a vertically movable cam member or plate 80, provided with a multiplicity of cam elements, preferably angular cam slots 81 of diverse pitches, one for each of arms 65, together with cam follower elements 82 carried by arms 65 and received within the cam slots 81. This cam plate 80 is located between arms 65 and the aforementioned mounting plate 73. Secured to the ends of this cam plate, on its side opposite from arms 65, as by means of studs 83, are nut members 84 which project through apertures 85 in plate 73 and which engage vertical lead screws 86 located beyond on the opposite side of plate 73 from cam plate 80. These lead screws 86, which are supported and operated as later to be described, are operable to move cam plate 80 in a vertical direction. As previously mentioned, arms 65 are furnished with follower blocks 82 received in cam slots 81. These follower blocks are pivotally connected to arms 65, preferably at approximately the midpoint of the latter, by means of pivot pins 88, and cam slots 81 are angularly disposed, so that when cam plate 80 is moved in a vertical direction, arms 65 are swung in a transverse plane on their pivots 66.

The cam slot in plate 80 corresponding to the arm 65 suspending from fixed pivot pin 72 is vertically disposed and hence imparts no movement to the associated arm 65. This fixed arm and vertical cam slot, though preferably offset a slight distance from the center line of the machine, represent the center of symmetry of the cam slots, and of the swinging motion of the arms. The remaining cam slots are then symmetrically arranged on opposite sides of said central slot, and as here shown, slope inwardly or toward the center in a downward direction, the angle of inclination of successive slots being progressively greater with increasing distance from the center (see Fig. 4).

In the particular machine here illustrated, the central band blade 30 will be understood to have its two courses received by the blade guides carried by the fixed arm and by the adjacent arm on the left-hand side, as viewed in Fig. 4. The next band blade on the left-hand side of center has its two courses received by the guides carried by the next two arms, while the two courses of the band blade immediately to the right of the central blade are received by the guides carried by the two arms just to the right of the central arm, and so on.

Thus it will be understood that movement of cam plate 80 from its lowermost to its uppermost position will move arms 65 in opposite directions on the two sides of the center of symmetry so as to increase the spacing distances between successive guide slots, the inclinations of the cam slots being such that the spacing distances remain uniform with one another at all times. The adjustment is made while the machine is running, and the blades travelling through the guide slots in the guides 52 move readily along their drum to accommodate themselves to the adjusted positions of the guides.

Figure 7:
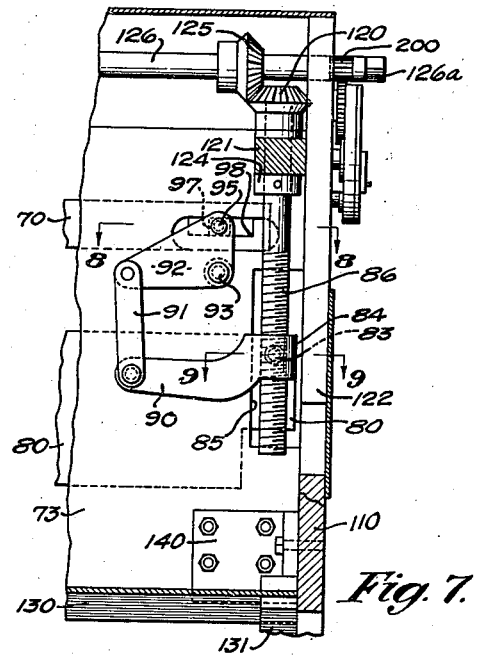
Fig. 7 is a fragmentary detail taken in the aspect of broken line 7—7 of Fig. 3.

It will be evident, from reference to Fig. 4, that because of the substantial angle of swing of the outermost arms 65, the blade guides associated therewith will, unless counter-provisions are made, have a substantial component of vertical movement in the course of adjustment between minimum and maximum blade spacing. This effect is preferably compensated by moving the outer ends of the swinging arms 70 and 71 as blade spacing adjustments are made. As here shown, the nut members 84 through which vertical movement is imparted to cam plate 80 are formed with inwardly extending brackets 90 (see Fig. 7), the inner ends of which are connected by links 91 to bell cranks 92 pivotally mounted at 93 on mounting plate 73, and having connection at 95 with the outer, swinging ends of arms 70 and 71. This connection may comprise (see Fig. 8) a stud 96 projecting from member 92, the latter carrying a slide block 97 received within a longitudinal guide slot 98 in the outer end portion of the corresponding swinging arm 70 or 71, a nut 99 on the outer end of stud 96 holding the members in assembly. As cam plate 80 is moved in an upward direction, for example, so as to swing arms 65 outwardly, the corresponding elevation of brackets 92 acts through links 91, bell cranks 92 and slide blocks 97 to lower the outer ends of arms 70 and 71, the linkage being such that arms 70 and 71 will be lowered in an amount to compensate for the otherwise substantial elevation of the blade guides carried by the swinging arms 65. Thus the alinement of the blade guides 52 is approximately maintained throughout adjustment for slice thickness.

Vertical frame members 110 and 111 are located just outside the adjustment mechanism for the upper blade guides, frame member 111 being supported from main frame channel member 18 by suitable brackets or posts such as indicated at 113, and frame member 110 being provided with arms 114 secured by means of posts 115 to a vertical main frame column 116 that extends from base 15 to top 17.

On the upper ends of lead screws 86 are bevel gears 120, the hubs of which bear downwardly against brackets 121 in which the lead screws 86 are journaled, said brackets 121 having portions 121a secured to plates 122 which are vertically slidable, for a purpose to be mentioned later, on offset portions 110a and 111a of frame members 110 and 111, respectively. Thus the vertical edges of plates 122 slidably engage vertical edges 123 of offset portions 110a and 111a of frame members 110 and 111. Collars 124 mounted on lead screws 86 immediately below brackets 121 confine the lead screws against vertical movement with reference to brackets 121. Bevel gears 120 mesh with bevel gears 125 on a transverse shaft 126 journaled in the aforementioned plates 122. The forward end of shaft 126 is squared, as indicated at 126a, for engagement by a suitable manual crank, not illustrated, by which it may be rotated. Thus rotation of shaft 126 by such a crank will operate bevel gears 125 and 120 to rotate lead screws 86, and thus accomplish the previously described vertical adjustment of cam plate 80 to adjust the spacing of blade guides 52.

As previously mentioned, a suitable means is provided for guiding, or serving as hold down member for, the top sides of the loaves, and in the present illustrative machine, I provide a means for this purpose separate of and below the upper blade guides 52. As a typical construction, I illustrate a hold-down plate 130 located ahead of the blades and disposed at the inclination of the path of loaf travel through the slicing zone. This hold-down plate 130 is supported at its opposite edges by the lower legs 131 of bracket members 132, said bracket members also having vertically extending legs 133 mounted on a casing 134 enclosing the upper blade guide adjustment mechanism; screws 136 reaching through the wall of casing 134 and engaging the edges of the aforementioned vertically adjustable plates 122 serve to secure brackets 132 rigidly to said plates 122. Loaf hold-down plate 130 is further supported by brackets 140 secured to the aforementioned vertical mounting plate 73.

To provide for loaves of different heights, loaf hold-down plate 130 together with the entire upper blade guide mechanism is adjustably movable in a vertical direction. The previously mentioned brackets 121 which serve to journal and support lead screws 86 have portions 141 to which the previously described mounting plate 73 is rigidly secured. Plate 73, plates 122, together with the entire upper blade guide adjustment mechanism, as well as loaf hold down plate 130, comprise a unit which is bodily movable in a vertical direction. It has been mentioned that the edges of plates 122 are vertically slidable along the vertical edges 123 of frame members 110 and 111. The described vertically adjustable assembly is further guided by means of key members 145 mounted on plate 73 and engaging in vertical guide ways 145a formed in frame members 110 and 111 (see Figs. 4 and 6).

Brackets 121 also have projecting nut portions 150 which threadedly engage vertical lead screws 151. These lead screws 151 are supported by bearings 152 and 153 extending from portions 110a and 111a of frame members 110 and 111, respectively. Mounted on lead screws 151 above bearings 153 are bevel gears 154, collars 155 immediately below bearings 153 confining the lead screws against endwise movement. Bevel gears 154 mesh with bevel gears 156 on a horizontal transverse shaft 157, the latter being journaled in the upper ends of frame portions 110a and 111a. Shaft 157 may be driven in any suitable manner; for example, its forward end is shown as having a squared portion 157a adapted for engagement by a hand crank, not shown.

It will be understood that rotation of shaft 157 will effect rotation of lead screws 151, and therefore vertical adjustment movement of the assembly comprising mounting plates 73 and 122, together with the upper blade guides 52 and their spacing adjustment mechanism, and also loaf hold down plate 130. Thus the adjustment described enables the spacing distance between lower guide plates 54 (which serves both as bottom guide for the loaves and as guides for the blades), and hold-down plate 130 to be regulated for loaves of different heights.

The mechanism here illustrated also shows, in addition to loaf hold-down plate 130, which is located ahead of the blades, a second loaf hold-down member in the form of a bar 130a (see Fig. 3) mounted on brackets 132 to the rear of the blades.

Figure 3:
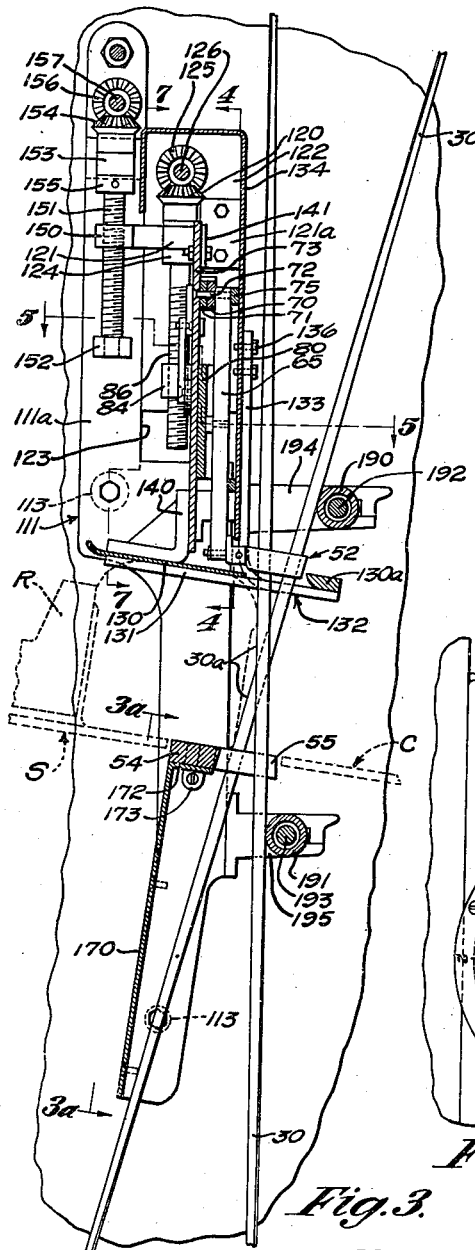
Fig. 3 is an enlarged section taken on line 3—3 of Fig. 2.

It has previously been mentioned that the loaves in advancing toward the blades may be supported by an inclined sustaining plate or table, such as indicated at S, which may support the loaf until it is advanced onto the slotted plate 54. This sustaining member may then be retracted to permit the next loaf to be elevated to position along a guide plate 170, the latter being secured to the edge of frame members 110 and 111 (see Figs. 3 and 3a). The upper portion of plate 170 is received between frame members 110 and 111, and has a forwardly bent portion 172, which serves as the support for guide plate 54. The portion 172 of plate 170 is here indicated as provided with ears 173 secured to frame members 110 and 111 as indicated in Fig. 3.

The slotted loaf and blade guide plate 54 is adapted to be quickly removed from the machine for the purpose of interchange with other plates having different spacing intervals between blade guide slots 55. As here shown, the plate 54 has at its ends keys as indicated at 180 which are downwardly receivable in vertical key-ways 181 formed between blocks 182 secured, as by welding, to the inner surfaces of frame members 110 and 111. The plate 54 is thus mounted in the machine by fitting keys 180 into key ways 181 and lowering until it rests on the portion 172 of plate 170. Plate 54 is then secured in position as by means of a manually operable screw 185 which is screwthreaded in frame member 110 and engages the key portion 180 at the end of the plate, as will be made clear from an inspection of Fig. 12.

Immediately beyond guide plate 54 there is provided a suitable out-feed means for receiving the sliced loaves and conveying them forwardly. Any suitable out-feed conveyer, diagrammatically indicated in Fig. 3 at C may be employed, though a suitable form is disclosed in my Patent No. 2,179,659, dated November 14, 1939. Any suitable loaf in-feed means may be employed for advancing the loaves one at a time through the blades. Thus there may be employed a conventional reciprocating ram, indicated diagrammatically at R in Fig. 3, and which will be understood to have the usual spaced ram fingers adapted to advance between the blade courses. It will of course be evident that provision must be made for changing the spacing of the ram fingers to correspond to changes in blade spaces. Suitable infeed mechanism of the type indicated at R and S is described in my Patent No. 2,106,949.

The drawings illustrate the preferred use of a pair of long backing-up rollers 190 and 191 for the blades, which are rotatably mounted in any suitable manner on shafts 192 and 193, respectively, said shafts being supported by suitable mountings such as indicated at 194 and 195, respectively, extending from frame members 110 and 111. For a more complete description of such backing up rollers reference may be had to my Patent No. 2,179,659.

Figure 13:
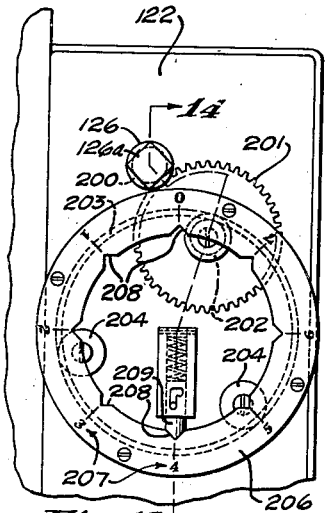
Fig. 13 is an enlargement of a portion of Fig. 1, showing an illustrative slice thickness gauge.
Figure 14:
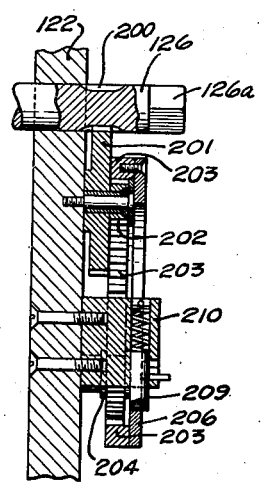
Fig. 14 is a section taken on broken line 14—14 of Fig. 13.

Figs. 13 and 14 show the provision of a gauge to indicate the thickness of slice for which the machine is adjusted, and also the provision of detent means to facilitate adjustment of blade spacing to exact predetermined spacing intervals. The aforementioned shaft 126, which is rotated in order to move cam plate 80 up or down to adjust blade spacing, is formed with gear teeth at 200, as shown in Fig. 14, and meshing with these gear teeth is a gear 201 mounted on vertically adjustable mounting plate 122. This gear 201 carries a smaller gear 202, which meshes with an internal gear 203, the latter being supported by gear 202 and also by a pair of pulleys or rollers 204 mounted on plate 120, as will be readily understood from inspection of Figs. 13 and 14. The chosen gear ratios are such that gear 203 will make, for example, one revolution while vertically movable cam plate 80 is moving between its upper and lower limits of travel. Secured to the outer face of this internal gear 203 is an index ring 206, containing indicia such as indicated at 207 to indicate blade spacing. The inner periphery of ring 206 is notched at predetermined intervals, as indicated at 208, and a spring pressed detent 209 bearing on the inner periphery of ring 206 engages in these notches when predetermined slice thickness intervals are reached. The spring pressed detent 209, which is here shown as carried by a supporting member 210 secured to plate 122, is also utilized as an indicator, the ring 206 being so calibrated that a numeral opposite the notch in which the spring pressed detent is engaged will indicate the slice thickness for which the machine is then set. As shaft 126 is rotated to move the blade guides 52 to different spacing intervals, the spring pressed detent 209 is spring-actuated into and then cammed back out of the successive notches 208. By stopping the adjustment movement of shaft 126 when the detent 209 is in full engagement with a selected notch 208, there is assurance that the blades have been moved accurately to the new spacing interval desired. By thus positively assuring the accuracy to the blade spacing adjustment, there is assurance that no difficulty will be encountered in thereafter installing a guide plate 54 having the spacing interval for which the gauge indicates the guides 52 are then set.

Briefly summarizing, the operation of changing the blade spacing of the machine of the present invention is as follows: The fixed guide plate 54 is first removed. Then, with the machine running, the adjustable guides 52 are adjusted to the new blade spacing, the guides acting in the nature of belt shifters, and the band blades moving readily to the new selected spacing. A new fixed guide plate 54, having blade guide slots 55 spaced by intervals corresponding to the new spacing of the blades on the machine, is then installed, the blade courses being first properly threaded in the slots 55, and the plate 54 then being moved down into position and tightened, in the manner previously described.

The combination of the row of adjustable guides above the loaf path with an interchangeable fixed guide below the loaf path has a number of outstanding advantages, never before realized. The fixed guide below the loaf is rigidly mounted in the machine, and the effect of its rigidity extends upwardly across the slicing zone to the adjustable guides 52. Thus, the guide slots 55 in the fixed and rigidly mounted plate 54 accurately position and space the blade courses. And this accuracy of spacing is carried upwardly by the blades to the adjustable guides 52, thus assuring increased stability and increased uniformity of spacing of the latter. Blade spacing is changed with a few easily performed operations, consuming but a few moments of time. The blades need not be detensioned, and are never out of control. At the same time, blade spacing is always more uniform and the machine more stable than when adjustable guides are utilized both above and below the loaf path.

I have now disclosed in considerable detail one illustrative slicing machine in accordance with the present invention; it is to be understood, however, that this is for illustrative purposes only, and that various changes in design, structure and arrangement may be made without departing from the spirit and scope of the invention or of the appended claims.

I claim:

1. A band blade slicing machine comprising a stationary frame, spaced blade supporting drums mounted for rotation on said frame, a multiplicity of tensed band blades running about said drums and providing between said drums a multiplicity of blade courses that run in spaced parallel slicing planes spaced transversely of the machine, a multiplicity of individual adjustable blade guides, one for each blade course, each of which has a guide slot adapted to receive a blade course and to constrain it to run in one of said parallel slicing planes, means supporting said individual guides for movement in a direction transversely of the multiplicity of blade courses in such a manner as to permit increase or decrease in the spacing interval between said guides, fixed blade guide means having blade guide slots of fixed spacing interval detachably mounted on said stationary frame in a position spaced longitudinally of the blade courses from said adjustable guides, so as to provide a slicing zone between said individual adjustable guides and said fixed blade guide means, said blade guide slots of said fixed blade guide means being adapted to receive said blade courses and to constrain them to run in said parallel slicing planes, and acting through the blade courses to stabilize the positions of said individual blade guides at a spacing interval corresponding to the fixed spacing interval of said guide slots in said detachable blade guide means.

2. A band blade slicing machine comprising a stationary frame, spaced blade supporting drums mounted for rotation on said frame, a multiplicity of tensed band blades running about said drums and providing between said drums a multiplicity of blade courses that run in spaced parallel slicing planes spaced transversely of the machine, a multiplicity of individual adjustable blade guides, one for each blade course, each of which has a guide slot adapted to receive a blade course and to constrain it to run in one of said parallel slicing planes, blade spacing adjustment means for spreading said individual blade guides apart or moving them together, and fixed rigid blade guide means having blade guide slots of fixed spacing interval detachably mounted on said stationary frame in a position spaced longitudinally of the blade courses from said adjustable guides, so as to provide a slicing zone between said individual adjustable guides and said fixed guide means, said blade guide slots of said fixed blade guide means being adapted to receive said blade courses and to constrain them to run in said parallel slicing planes.

3. A band blade slicing machine comprising a stationary frame, spaced blade supporting drums mounted for rotation on said frame, a multiplicity of tensed band blades running about said drums and providing between said drums a multiplicity of blade courses that run in spaced parallel slicing planes spaced transversely of the machine, a multiplicity of individual adjustable blade guides, one for each blade course, each of which has a guide slot adapted to receive a blade course and to constrain it to run in one of said parallel slicing planes, blade spacing adjustment means for spreading said individual blade guides apart or moving them together, and detachable blade guide means having blade guide slots of fixed spacing interval rigidly mounted on said stationary frame in a position spaced longitudinally of the blade courses from said adjustable guides, so as to provide a slicing zone between said individual adjustable guides and said fixed guide means, said blade guide slots of said fixed guide means being adapted to receive said blade courses and to constrain them to run in 4. A band blade slicing machine comprising a stationary frame, spaced blade supporting drums mounted for rotation on said frame, a multiplicity of tensed band blades running about said drums and providing between said drums a multiplicity of upwardly and downwardly travelling blade courses that run in spaced parallel slicing planes spaced transversely of the machine, a multiplicity of individual adjustable blade guides, one for each blade course, each of which has a guide slot adapted to receive a blade course and to constrain it to run in one of said parallel slicing planes, means supporting said individual guide for movement in a direction transversely of the multiplicity of blade courses in such a manner as to permit increase or decrease in the spacing interval between said guides, fixed blade guide means having blade guide slots of fixed spacing interval detachably mounted on said stationary frame in a position spaced below said adjustable guides, so as to provide a slicing zone between said individual adjustable guides and said fixed blade guide means, said blade guide slots of said fixed blade guide means being adapted to receive said blade courses and to constrain them to run in said parallel slicing planes, and acting through the blade courses to stabilize the positions of said individual blade guides at a spacing interval corresponding to the fixed spacing interval of said guide slots in said detachable blade guide means.

5. A band blade slicing machine comprising a stationary frame, spaced blade supporting drums mounted for rotation on said frame, a multiplicity of tensed band blades running about said drums and providing between said drums a multiplicity of blade courses that run in spaced parallel slicing planes spaced transversely of the machine, a multiplicity of individual adjustable blade guides, one for each blade course, each of which has a guide slot adapted to receive a blade course and to constrain it to run in one of said parallel slicing planes, blade spacing adjustment means for spreading said individual blade guides apart or moving them together, detent means for releasably stopping said blade spacing adjustment means with the blade guides positioned at different predetermined spacing intervals, and interchangeable fixed blade guide means each having blade guide slots of a fixed spacing interval corresponding to one of said predetermined spacing intervals, said fixed blade guide means being detachably mounted on said stationary frame in a position spaced longitudinally of the blade courses from said adjustable guides, so as to provide a slicing zone between said individual adjustable guides and said fixed guide means, said blade guide slots of said fixed blade guide means being adapted to receive said blade courses and to constrain them to run in said parallel slicing planes.

6. A band blade slicing machine comprising a stationary frame, spaced blade supporting drums mounted for rotation on said frame, a multiplicity of tensed band blades running about said drums and providing between said drums a multiplicity of blade courses that run in spaced parallel slicing planes spaced transversely of the machine, a multiplicity of individual adjustable blade guides, one for each blade course, each of which has a guide slot adapted to receive a blade course and to constrain it to run in one of said parallel slicing planes, means supporting said individual guides for movement in a direction transversely of the multiplicity of blade courses in such a manner as to permit increase or decease in the spacing interval between said guides, detent means for releasably holding said individual blade guides at different predetermined spacing intervals, and interchangeable fixed blade guide means each having blade guide slots of a fixed spacing interval corresponding to one of said predetermined spacing intervals, said fixed blade guide means being detachably mounted on said stationary frame in a position spaced longitudinally of the blade courses from said adjustable guides, so as to provide a slicing zone between said individual adjustable guides and said fixed blade guide means, said blade guide slots of said fixed blade guide means being adapted to receive said blade courses and to constrain them to run in said parallel slicing planes, and acting through the blade courses to stabilize the positions of said individual blade guides at a spacing interval corresponding to the fixed spacing interval of said guide slots in said detachable blade guide means.

7. A band blade slicing machine comprising a stationary frame, spaced blade supporting drums mounted for rotation on said frame, a multiplicity of tensed band blades running about said drums and providing between said drums a multiplicity of blade courses that run in spaced parallel slicing planes spaced transversely of the machine, a multiplicity of individual adjustable blade guides, one for each blade course, each of which has a guide slot adapted to receive a blade course and to constrain it to run in one of said parallel slicing planes, blade spacing adjustment means for spreading said individual blade guides apart or moving them together, a member operatively connected with said blade spacing adjustment means and movable between predetermined limits as said adjustment moves between minimum and maximum blade spacing positions, detent means operatively associated with said member in a manner to releasably stop said blade spacing adjustment means with the blade guides positioned at different predetermined spacing intervals, and interchangeable fixed blade guide means each having blade guide slots of a fixed spacing interval corresponding to one of said predetermined spacing intervals, said fixed blade guide means being detachably mounted on said stationary frame in a position spaced longitudinally of the blade courses from said adjustable guides, so as to provide a slicing zone between said individual adjustable guides and said fixed guide means, said blade guide slots of said fixed blade guide means being adapted to receive said blade courses and to constrain them to run in said parallel slicing planes.

WILLIAM WALTER HARTMAN.

CERTIFICATE OF CORRECTION.

Patent No. 2,254,524.  September 2, 1941.

WILLIAM WALTER HARTMAN.

It is hereby certified that error appears in the printed specification of the above numbered patent requiring correction as follows: Page 7, first column, line 4, claim 3, after "in" insert the words and period --said parallel slicing planes.--; and that the said Letters Patent should be read with this correction therein that the same may conform to the record of the case in the Patent Office.

Signed and sealed this 14th day of October, A. D. 1941.

(Seal)

Henry Van Arsdale,
Acting Commissioner of Patents.